March 3, 1970      E. A. LINDGREN      3,498,011
UTILITY ROOM
Filed Nov. 6, 1967      3 Sheets-Sheet 1
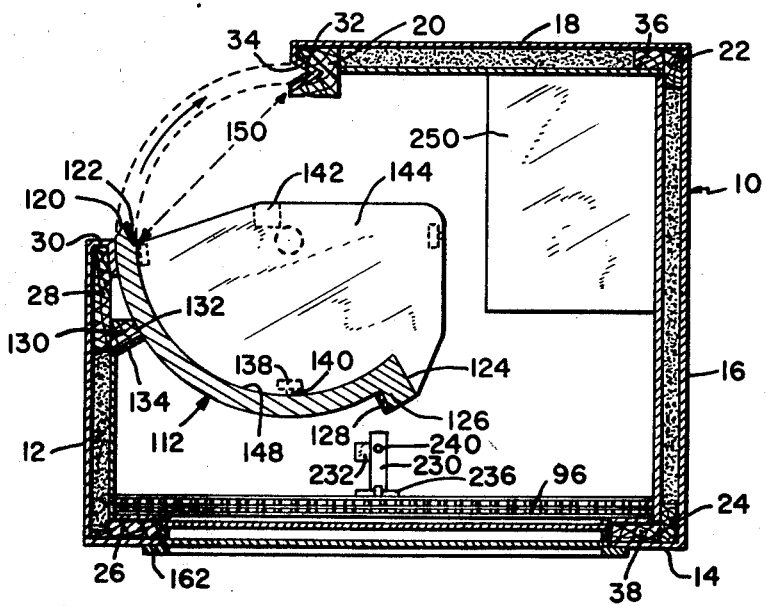
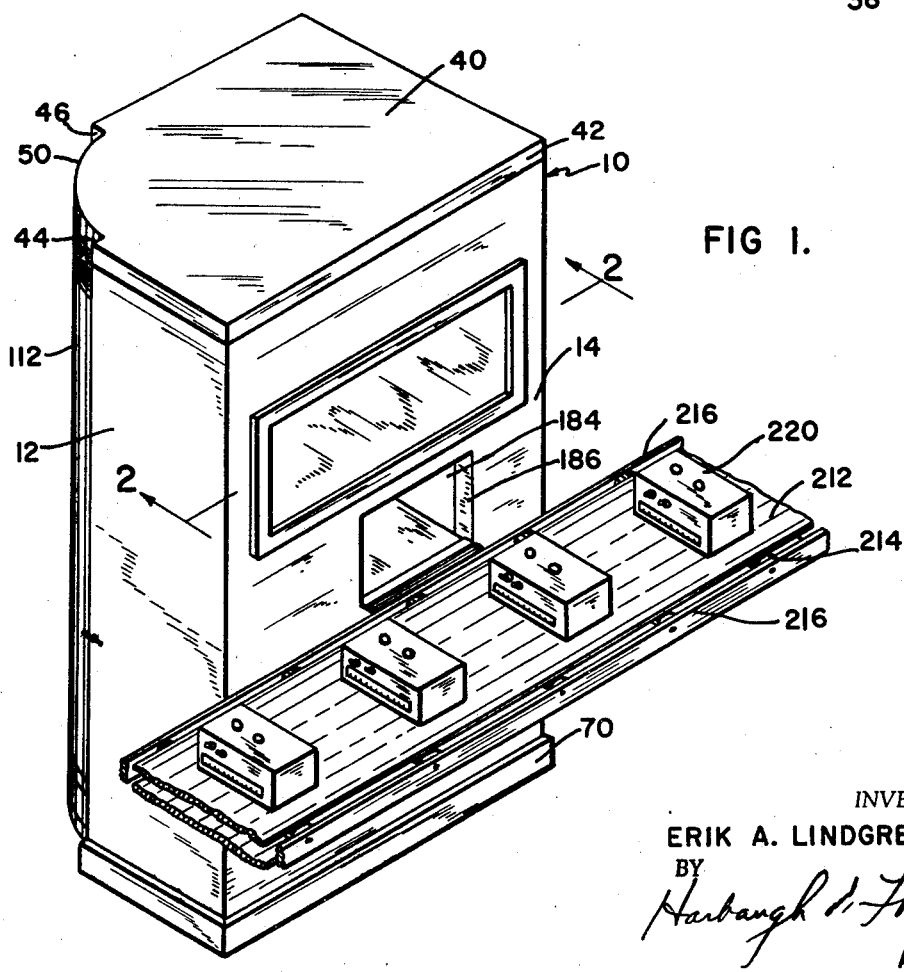
INVENTOR.
ERIK A. LINDGREN
BY
ATTY'S.

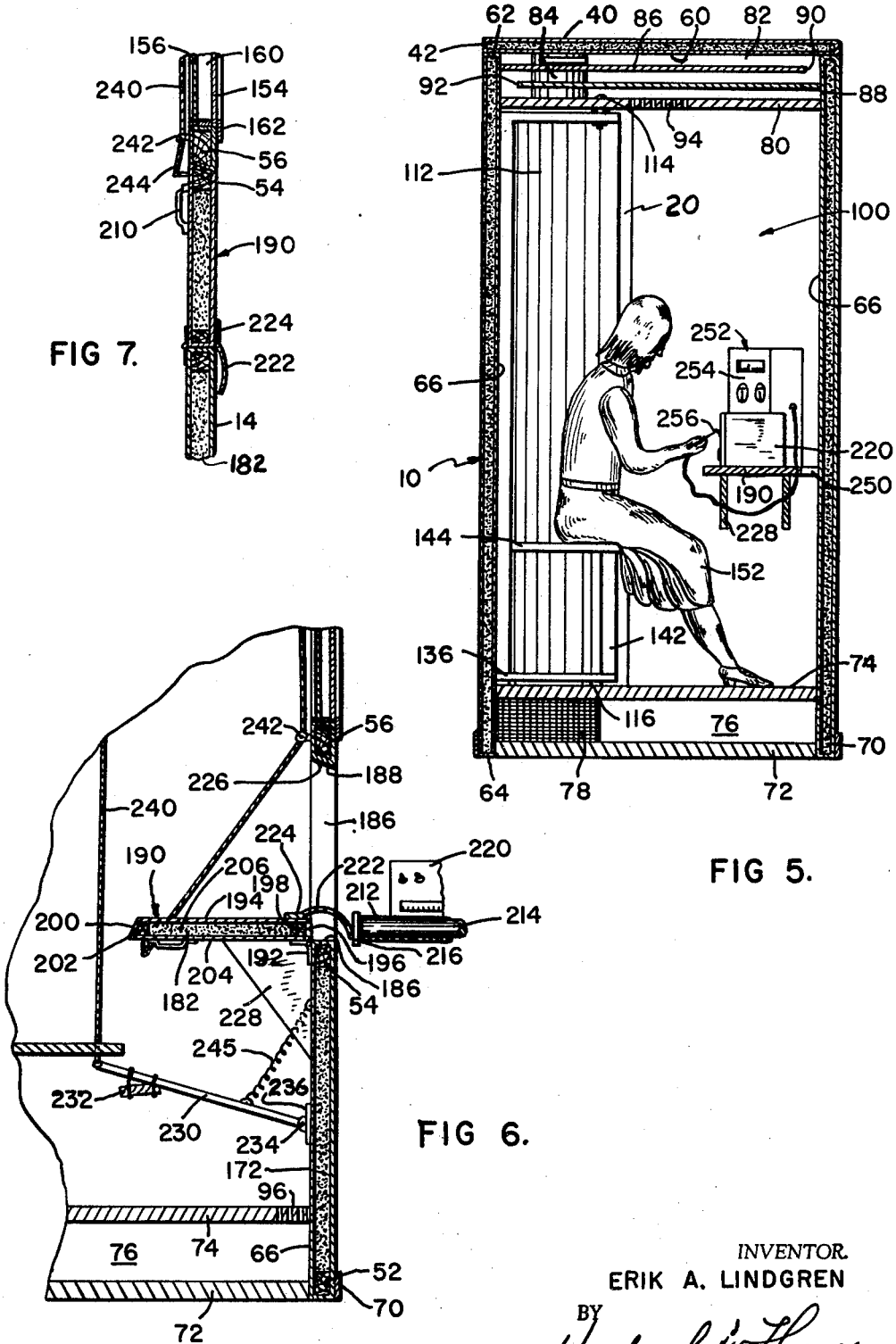

March 3, 1970  E. A. LINDGREN  3,498,011
UTILITY ROOM

Filed Nov. 6, 1967  3 Sheets-Sheet 3

INVENTOR.
ERIK A. LINDGREN
BY
Harbaugh & Thomas
ATTY'S.

United States Patent Office 3,498,011
Patented Mar. 3, 1970

3,498,011
UTILITY ROOM
Erik A. Lindgren, 4515 N. Ravenswood,
Chicago, Ill. 60640
Filed Nov. 6, 1967, Ser. No. 680,653
Int. Cl. B66b 9/00; E04h 3/04
U.S. Cl. 52—31    7 Claims

ABSTRACT OF THE DISCLOSURE

The disclosure describes a compact, portable utility room comprising as an illustrated embodiment an enclosure formed with insulated walls which are impermeable to various types of air-borne interference and having a combined door and seat pivotally mounted in one corner which is automatically locked in closed position by the occupant. The enclosure is a substantially impermeable barrier to vapors, sound and wave-formed interference wherein tests may be conducted of an analytical or electrical nature on products or components of a product in a convenient manner under controlled environmental conditions. In one embodiment a sectional wall is provided with an essentially seamless outer shell and a sound-, radio wave-, or vapor-absorbing core.

BACKGROUND OF THE INVENTION

This invention relates to control of the conditions under which product testing manipulations are conducted. In the industrial production of electrical products such as radios, television sets and scientific instruments it is imperative that tests be conducted to determine the performance characteristics of component parts thereof or the finished product to insure their suitability for the intended use. Similar critical tests of a chemical or analytical nature are made in the control of products or raw materials used in or produced by industrial, chemical, pharmaceutical or petroleum processes. The assembly line method is extensively used in the production of pharmaceuticals and fabrication or assembly of electrical products or components to be used in electrical products. At one or more stages in the production it is the practice to conduct various tests to make certain all components exhibit the proper physical, electrical or chemical characteristics, are of standard weight, are correctly assembled and to detect contamination or loose circuits, etc. The test instruments used to make these determinations are highly specialized, accurate and accordingly sensitive to interference from the environment of the test.

Time and productivity are lost if the tests of the work product in any way interrupt or slow down the production line. To be of value some tests must be made in a limited time so that prompt alterations in processing conditions can be made. However, it is not always advisable or possible to conduct all of the tests at the production line because of noise, dust, vaporous, magnetic, static and electrical interference that may exist in the manufacturing facility. The production of scientific instruments, employing components which are sensitive to or adversely influenced by these sources of interference, requires special precautions to eliminate these factors which not only upset the measurements being made but also may adversely influence the functionality or performance of the product and annoy or inconvenience the test personnel during that period when concentration and accuracy are most important.

As the production methods become more sophisticated or are automated and the sensitivity of the product to its test environment increases, the magnitude of air-borne interference factors is also increased, requiring expensive counter measures. It is known that air-borne interference in the form of vapors, sound, light, static electricity, suspended solids, charged dust particles, magnetic fields and electronic emissions can in particular instances and some times consistently cause production break-downs or the malfunctioning of electrical components, products, analytical tests or test equipment. There is accordingly a need for an enclosure for use in conducting performance tests of this kind which is economical to build, easily transported, convenient to use, and provides both comfort for the operator and the necessary protection from air-borne interference.

SUMMARY OF THE INVENTION

This invention concerns a protective enclosure for both personnel and test equipment for use in conducting analytical or electrical tests on a work product which is characterized by its particular construction whereby the various forms of air-borne interference are eliminated or mitigated. The protective enclosure or utility room of this invention is readily fabricated from the latest materials of construction, is of compact size and is adapted to be adjusted to provide a comfortable, safe, interference-free atmosphere for the conduction of any type of test or function and allows control of the environment to and within the critical limits adaptable to the test being conducted.

In accordance with this invention the enclosure provides a practically continuous outer shell and an inner shell wall of the same or different materials of construction, defining an envelope or space adapted for use as a confining area for a liquid, solid or vaporous shield having barrier properties for the air-borne interference encountered. In one embodiment the outer substantially continuous shell is constructed of metal, thse inner shell is of a sound-deadening fiberboard and the space or envelope between is filled with a particulate solid barrier such as glass wool, earth, sand, asbestos, paper, cellulose, macerated cloth, rubber, plastic beads, glass beads, and the like having the desired shielding properties. A particular form of revolving door and combined seat for the easy entrance and exit of personnel is provided which resists inadvertent opening from the outside, is self-sealing and self-locking and is both comfortable and convenient. In another embodiment the walls, ceiling, floor and auxiliary parts are arranged for maximum insulating effect with means being provided to ventilate the enclosure with least interference from sound or the outer atmosphere. The device of this invention is also adapted for use in conjunction with an assembly line with means provided for opening the enclosure to receive therein a work product for testing.

Accordingly, a primary object of this invention is to provide a utility room of space-saving design adapted to be placed adjacent a continuous source of a work product such as an assembly line whereby the personnel therein can receive the work product, conduct tests in a controlled sealed atmosphere without hindrance from airborne interference from the surrounding atmosphere and return same to the assembly line in a time-saving manner. These and other objects and embodiments will be described or become apparent as the specification proceeds.

DESCRIPTION OF THE DRAWINGS

An embodiment of this invention is shown in the drawings wherein:

FIG. 1 is a front perspective view of the utility room of this invention shown adjacent an assembly line;

FIG. 2 is a cross-sectional view taken along lines 2—2 of FIG. 1;

FIG. 5 is a cross-sectional view of the utility room taken along lines 5—5 of FIG. 4 showing a person therein making a test;

FIG. 6 is a fragmentary view in cross-section showing one form of side-opening door adapted to function with a conveyor system, and FIG. 7 is a fragmentary view in cross-section showing the door of FIG. 6 in closed position.

THE PREFERRED EMBODIMENT

Figure 3:
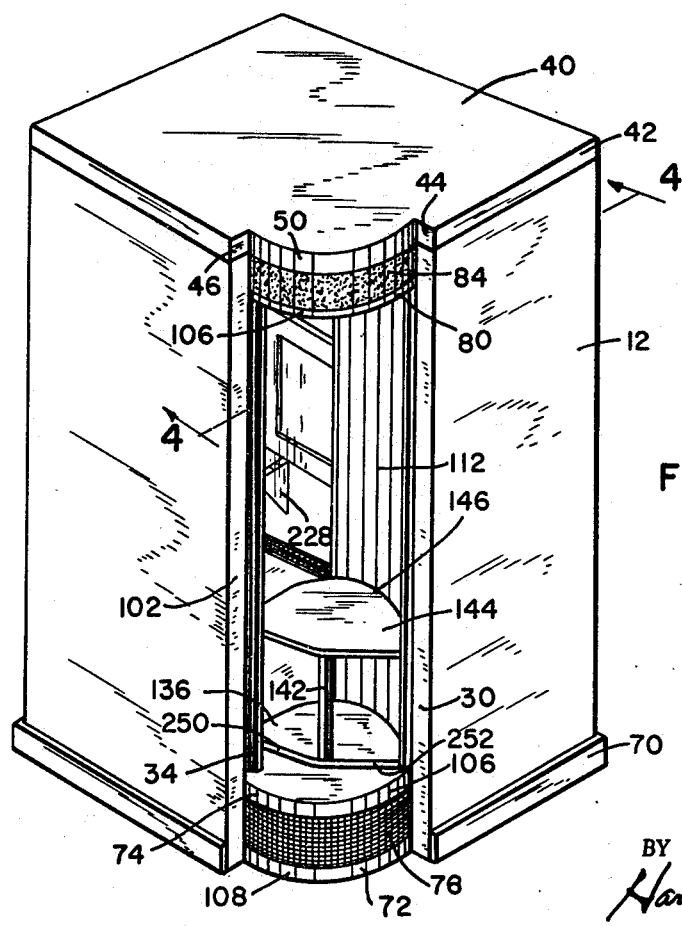
FIG. 3 is a back perspective view of the utility room with the revolving door open to show parts of the interior and the seat.

Referring to the drawings, particularly FIGS. 1, 2 and 3, the utility room of this invention is shown to comprise a one-piece outer shell 10 formed into a side wall 12, front wall 14, side wall 16 and rear wall 18 and held in position by a framework of studs 20, 22, 24, 26 and 28. The side wall 12 and rear wall 18 are foreshortened to provide a plenum at one corner. The side wall 12 has a flanged edge 30 crimped around the longitudinal edge and part of the inner side of the stud 28. The stud 20 has a longitudinal V-shaped notch or groove 32 in its outer edge, into which the V-shaped flange 34 of the back wall 18 is crimped. Corner-forming studs 36 and 38 are provided adjacent the studs 22 and 24 respectively.

A top member 40 is provided, shaped to conform with the generally rectangular outline of the shell 10 and is also constructed of one piece with a down-turned peripheral flanged edge indicated at 42. This flange is proportionally foreshortened and inwardly crimped at the corners 44 and 46 between which the flange has an arcuate shape 50 conforming with the plenum. As shown in FIGS. 5, 6 and 7 suitable cross members 52, at the bottom, and intermediate cross members 54 and 56 are provided as parts of the inner framework. The framework members can be made of metal, plastic or wood, and are preferably formed of hardwood.

Referring to FIG. 5 the flange 42 of the top member 40 is shown joined at its peripheral edge to the inner top wall 60 to form a unitized structure. The top edge of the shell member 10 is turned inwardly to form the flange 62, also affixed to the inner top wall 60. A similar construction is shown at the bottom edge of the shell member 10 where the bottom flange 64 is crimped inwardly. The inner edges of the flanges 62 and 64 are fixed to an inner unitary side wall 66. A baseboard 70 is provided on the outer bottom edge of the shell 10 which may be of rubber or like insulating material. The bottom floor member 72 extends to the inner peripheral edge of the inner wall 66 and is affixed thereto by any suitable means. These components form the basic outer enclosure of the utility room and container for the absorbent core material.

A sub-floor 74 is provided of substantially the same construction as the bottom floor 72, spaced thereabove to provide a soundproof air outlet space 76 covered at the plenum by the grill 78. A sub-ceiling 80 of similar construction is provided at the top of the room to form a soundproof air inlet space 82 covered at the plenum by the grill 84. A pair of coextending alternate baffles 86 and 88 are affixed across the space 82 with their opposite edges 90 and 92, respectively, being longitudinally spaced from the inside of the wall 66. The space is such that the path taken by the incoming air is tortuous and the volumetric flow therethrough is substantially uniform there being substantially no restrictions or changes in the flow capacity of the air path in the space 80.

The ceiling member 80 has a centrally located air inlet grill 94 and the sub-floor member 74 has a longitudinal air outlet grill 96 (FIGS. 2 and 6) extending along one side and communicating between the room space 100 (FIG. 5), the outlet space 76 and the bottom grill 78.

Figure 4:
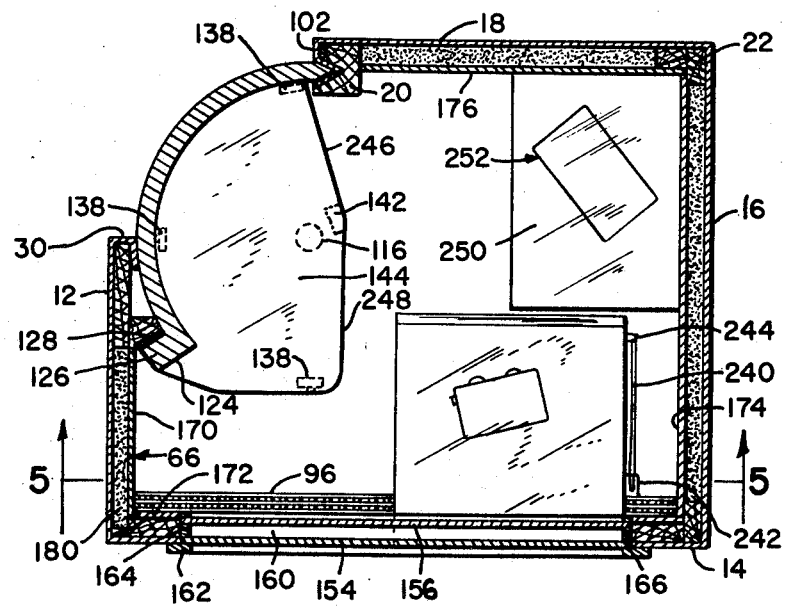
FIG. 4 is a cross sectional view taken along lines 4—4 of FIG. 3.

Referring to FIGS. 1, 3 and 4 it is seen that the shell 10 has a foreshortened flanged edge 102 which with the edge 30 match the edges 44 and 46 of the top member 40 and the edges 50, 106 and 108 of the top, sub-ceiling, sub-floors and bottom members are similarly curved within the plenum and form a framework for the curved grills 87 and 78 (see FIG. 3).

A similarly curved door member 112 is suspended in rotatable relationship by means of axle or pivot bolt 114, at the top, extending through the sub-ceiling 80 and the axle or pivot bolt 116, at the bottom, extending through the sub-floor 74. The door 112 has a V-shaped edge 120 which matches in sealed relationship with the notch 34 in the shell 10. The notch 34 extends from the sub-ceiling 80 to the top of the sub-floor 74.

The door 112 is curved to fit within the curve of the plenum between the edges 30 and 102 (FIG. 4) and is a segmented cylinder in cross-section adapted to pivot about 90°, as shown by the arrow in FIG. 2 on the pivot 114–116 (FIGS. 4 and 5) so that the edge 120 engages the notch 34 in closed position (FIG. 2). The edge 120 has a resilient weather or sealing strip 122 along the inside surface to engage the notch 34 in an air-tight juncture.

The inner edge 124 of the curved door 112 has an outwardly extending elongated radial flange 126 to which is affixed an elongated sealing strip 128. The frame structure 28 supports a vertical inner stud 130. The stud 130 has a radially curved inner surface 132 which matches the curve of the outer surface of the door 112. The stud 130 has affixed to its inner side an elongated sealing strip 134 which is as long as the door 112. The flange 126 and the stud 130 are similarly oriented, preferably in vertical position, so that when the door 112 is closed, as shown in FIG. 4, the two strips 128 and 134 are contiguous and sealed, and at the same time, the strip 122 is mated with the notch 34 also in sealed relationship (FIG. 2).

The door 112 has a transverse bottom member 136 (FIG. 5) engaged by the lower pivot 116 and carrying in recesses (not shown) therein the casters 138 (FIG. 2) upon axes 140 which are radially disposed from the pivot 116. This supports the door 112 in a free-moving pivotal position within the plenum. An upright support member 142 is affixed on the upper side of the bottom member 136 and extends to the bottom of the seat 144. The curved edge 146 of the seat 144 is fastened to the inner curved surface 148 of the door 112, the same as the bottom member 136, for proper rigidity of the parts.

As illustrated in FIGS. 2 and 3, the plenum and door provide an opening 150 into which a person 152 can step, be seated on the seat 144 and turn clockwise into the position shown in FIG. 5 by rotating the seat and door as a unit on the pivots 114–116.

The front wall 14 has a window comprising two spaced sheets of glass 154 and 156 (FIG. 4) with interposed air space 160, held by means of outer frame members 162 and inner frame members 164 and 166. The window is positioned at about eye level for a person seated in the enclosure 100. An inner wall 66 may be constructed of inner wall sections 170, 172, 174 and 176 affixed on the inside of the frame member to form a space 180 therebetween to accommodate a barrier material 182 as shown. The barrier material 182 can be a vapor, liquid or solid material having the property of absorbing the type of interference which is to be shielded from the enclosure 100.

The shell 10 has an opening 184 in the front wall 14 bordered by the crimped-in edge 186 of the shell at the sides and bottom and the angularly crimped edge 188 at the top. The door member 190 is supported by the bottom hinge 192 and has an outer wall 194 of the same or similar construction as the shell 10. This outer wall is crimped inwardly at the bottom 196 around the cross member 198 and in the angular crimp 200 around the top cross member 202 and joined to the inner wall 202 in a construction similar to the walls of the main enclosure. The space 206 is provided to contain the barrier material 182. A handle 210 for manual control of the door 190 is affixed on the inner wall 204.

The bottom edge 186 of the opening 184 is positioned about the thickness of the door 190 below the conveyor belt 212, running on the roller members 214 within the longitudinal frame member 216. The belt 212 is shown carrying a series of production line instruments 220 before the opening 184 into easy reaching distance of the person 152. A flexible elongated threshold member 222 of generally arcuate cross-section is affixed to the inner bottom of the wall 194, as at the flange 224 and has its outer surface in rubbing contact with the conveyor frame 216. This threshold can be an insulator, i.e. made of rubber or non-conducting plastic or can be a conductor to dissipate any static charges in the instrument 220 or the conveyor belt and frame. The threshold is curved such that it is in contact with the frame 216 at least in the fully open position of the door 190.

FIG. 7 shows the door 190 in its closed position with the angular crimps 200 in sealed contiguous position with the beveled edge 188. A recess not shown, is provided in the crimped edge 200 to engage the spring loaded detent 226 in the beveled edge 188. Other means for holding the door 190 in closed position can be used. A pair of support brackets 228 are attached to the inner wall 168 to provide lateral support for the door 190 in its opened position.

In one embodiment of this invention a treadle 230 is provided with foot pedal 232 and pivoted at one end to the wall section 172 by means of the pin 234 held by the bracket 236 (FIG. 2). A cable member 240 is affixed to the extended end of the treadle 230 and passes through a suitable pulley arrangement 242 within the enclosure to fixed point 244 on the top outer corner of the door (FIG. 4). A return spring 245 (FIG. 6) is attached between the inner wall and a point intermediate the ends of the treadle member 230. If desired, the spring 245 can attach to the floor 74 instead of the wall 168. The door 190 is opened merely by pulling the handle 210 and closed by stepping on the pedal 232.

The arrangement of facilities inside the enclosure 100 can be of any desired combination of lighting, electrical outlets, compressed air, etc., to include a fixed shelf 250 upon which an instrument 252 is positioned for easy access to the control panel 254 on its front. An exemplary test probe 256 is shown in use by the operator 152 in FIG. 5.

The instrument 220, being tested can either be left on the door 190 during the test or moved to an auxiliary shelf (not shown) during this period, so that the door 190 can be closed during testing.

In one embodiment of this invention the shell 10 and frame members are made of sheet steel and all joints are of welded construction. The inner wall 66 is constructed of fiber board, the frame is of hardward and the door 112 is made of wood laminate. The barrier material 180 is preferably abestos or fiber glass. Where an all steel construction is used it may be desirable to insulate the enclosure from the base floor on which it is placed. In other uses, grounding of the enclosure may be warranted.

When the enclosure is unoccupied and the door 112 is closed, the door can be opened by rotational hand pressure on the outer surface. Once the plenum is occupied and the operator is seated, mere rotation of the body brings the door to its closed position. The truncated edges 246 and 248 of the seat 144 are in the same plane as the truncated edges 250 and 252 of the base member 136, respectively, so that foot room is provided between same and the frame member 20.

An exhaust fan (not shown) can be provided behind the grill 78 for withdrawal of the air from the enclosure and the intake of fresh air through the top grill 84. The enclosure can be individually air conditioned and filters of any desired composition can be used behind the grills 78 and 84.

From this description it is apparent that the enclosure of this invention is primarily suited for use in conjunction with a source of items 220 for testing as may be carried in the proximity of the opening 184 by the conveyor belt 212. The window is preferably constructed of plate glass or specially compounded glass which is resistant to or prevents the transmission of wave emissions of various wave lengths, i.e., gamma rays, ultraviolet rays, etc. Other uses for the enclosure are apparent to one skilled in this art.

The enclosure of this invention has two walls i.e. 12 and 18 disposed in planes which intersect at an angle. These walls have foreshortened edges or jamb members defining the corner plenum. A door member is pivotally mounted on an axis inside the angle between the intersecmounted on an axis inside the angle between the intersecting planes of the walls. The door member has an upright arcuate wall encompassing at least about 90°, to provide an adequate opening, depending also on its size, which is positioned between pivot points aligned inside the angle of the intersecting planes so that in open position its outer edge is contiguous with one edge of the plenum and in pivoted, closed position this edge is contiguous with the other edge of the plenum.

Although but one specific embodiment of this invention has been herein shown and described, it will be understood that details of the construction shown may be altered or omitted without departing from the spirit of the invention as defined by the following claims.

What is claimed is:
1. A unitary utility room comprising:
 (a) an enclosure defined by wall members and enclosing spaced top and bottom members,
 (b) a pair of said wall members being disposed in intersecting planes and having foreshortened edges defining a corner opening therebetween,
 (c) a door member pivotally mounted on an axis inside the angle between the intersecting planes of said wall members,
 (d) said door member having an arcuate wall extending the length of said opening,
 (e) said wall having an arcuate width sufficient to encompass said opening in closed position with the center of said arcuate wall being substantially coincident with said pivotal axis,
 (f) said door being adapted to pivot on said axis with the outer surface of said arcuate wall contiguous with the inner surface of one of said foreshortened edges of said wall members and positionable in said closed position with its edges in sealed relationship with both edges of said openings, and
 (g) said arcuate wall of said door member having a pair of transverse radially positioned support members affixed thereto at the top and bottom of said door and engaging said pivotal axis.

2. A unitary utility room in accordance with claim 1 in which:
 (a) said arcuate wall of said door member has a pair of transverse radially positioned support members affixed thereto at the top and bottom of said door and engaging said pivotal axis.

3. A unitary utility room in accordance with claim 1 in which:
 (a) a transverse seat member is affixed inside the arc of said arcuate wall of said door member and spaced between said transverse support members.

4. A unitary utility room in accordance with claim 1 in which:
 (a) roller means are positioned on the underside of the bottom transverse member, the axes of said roller means being radially located in relation to said pivotal axis.

5. A unitary utility room in accordance with claim 1 including:
 (a) a sub-ceiling and a sub-floor member spaced respectively under and above said top and bottom members defining spaces therebetween, (b) grated openings communicating between said spaces and the outside of said enclosure, said grated openings being arcuate and positioned in radial conformity above and below said door member.

6. A unitary utility room comprising:
(a) an enclosure defined by wall members and enclosing spaced top and bottom members,
(b) a pair of said wall members being disposed in intersecting planes and having fore-shortened edges defining a corner opening therebetween,
(c) a door member pivotally mounted on an axis inside the angle between the intersecting planes of said wall members,
(d) said door member having an arcuate wall extending the length of said opening,
(e) said wall having an arcuate width sufficient to encompass said opening in closed position with the center of said arcuate wall being substantially coincident with said pivotal axis,
(f) said door being adapted to pivot on said axis with the outer surface of said arcuate wall contiguous with the inner surface of one of said foreshortened edges of said wall members and positionable in said closed position with its edges in sealed relationship with both edges of said opening,
(g) a sub-ceiling and a sub-floor member spaced respectively under and above said top and bottom members defining spaces therebetween, and
(h) grated openings communicating between said spaces and the outside of said enclosure, said grated openings being arcuate and positioned in radial conformity above and below said door member.

7. A unitary utility room in accordance with claim 6 in which:
(a) a baffle member extends across the space between top member said sub-ceiling to provide a tortuous non-restrictive air path therethrough.

References Cited

UNITED STATES PATENTS

| | | | |
|---|---|---|---|
| 1,491,039 | 4/1924 | Hansen et al. | 312—235 |
| 955,933 | 4/1910 | Arnold | 109—73 |
| 1,740,888 | 12/1929 | Davidson | 109—73 |
| 1,829,256 | 10/1931 | Benziger | 312—307 |
| 2,273,971 | 2/1942 | Love | 109—11 |
| 2,927,665 | 3/1960 | Hauf | 52—204 |
| 3,046,914 | 7/1962 | Sandberg | 109—73 |

REINALDO P. MACHADO, Primary Examiner

U.S. Cl. X.R.

52—36, 198, 204, 265; 109—73